(12) United States Patent
Schmidt et al.

(10) Patent No.: US 12,435,285 B2
(45) Date of Patent: Oct. 7, 2025

(54) PROCESS AND PLANT FOR REMOVING CARBON DIOXIDE AND WATER FROM SYNTHESIS GAS

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Matthias Linicus, Eppstein (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 378 days.

(21) Appl. No.: 18/122,905

(22) Filed: Mar. 17, 2023

(65) Prior Publication Data

US 2023/0295527 A1    Sep. 21, 2023

(30) Foreign Application Priority Data

Mar. 18, 2022   (EP) .................................... 22162889

(51) Int. Cl.
*C10K 1/08*    (2006.01)
*B01D 53/14*   (2006.01)
(Continued)

(52) U.S. Cl.
CPC .......... *C10K 1/085* (2013.01); *B01D 53/1406* (2013.01); *B01D 53/1425* (2013.01);
(Continued)

(58) Field of Classification Search
CPC .......... B01D 53/14; B01D 53/26; C10K 1/00; C10K 1/04; C10K 1/08; C10K 1/26
See application file for complete search history.

(56) References Cited

U.S. PATENT DOCUMENTS

| 4,591,370 A | 5/1986 | Gazzi et al. |
| 12,084,347 B2 * | 9/2024 | Schmidt ................. C10K 1/005 |

(Continued)

FOREIGN PATENT DOCUMENTS

| DE | 199 45 326 | 8/2000 |
| EP | 4 000 713 | 5/2022 |

(Continued)

OTHER PUBLICATIONS

European Search Report for corresponding EP 22162889.4, Aug. 26, 2022.

*Primary Examiner* — Sharon Pregler
(74) *Attorney, Agent, or Firm* — Elwood L. Haynes (57) ABSTRACT

The present invention relates to a gas scrubbing process and a plant for removing carbon dioxide (CO2) and water (H2O) from synthesis gas, wherein the synthesis gas includes at least hydrogen (H2), carbon dioxide (CO2) and water (H2O). The invention features a dedicated circuit for water removal which comprises a scrubbing apparatus for removal of water by means of the physical absorption medium used in the gas scrubbing process. The absorption medium supplied to the scrubbing apparatus is withdrawn from a thermal separation apparatus for separation of water and absorption medium. The circuit is arranged such that water entrained via synthesis gas to be purified cannot pass into the main absorption medium circuit which is formed inter alia by an absorption apparatus and a regeneration apparatus. The energy cost and the apparatus complexity especially in respect of the thermal separation apparatus is thus reduced.

17 Claims, 3 Drawing Sheets

(51) Int. Cl.
    *B01D 53/26*     (2006.01)
    *C10K 1/00*     (2006.01)
    *C10K 1/04*     (2006.01)
    *C10K 1/26*     (2006.01)

(52) U.S. Cl.
    CPC ............ *B01D 53/263* (2013.01); *C10K 1/005* (2013.01); *C10K 1/04* (2013.01); *C10K 1/26* (2013.01); *B01D 2256/16* (2013.01); *B01D 2256/20* (2013.01); *B01D 2257/504* (2013.01); *B01D 2257/80* (2013.01)

(56) References Cited

U.S. PATENT DOCUMENTS

| | | |
|---|---|---|
| 2005/0172807 A1 | 8/2005 | Mak |
| 2009/0241773 A1 | 10/2009 | Lechnick et al. |
| 2009/0241779 A1 | 10/2009 | Lechnick et al. |
| 2010/0111784 A1 | 5/2010 | Mak et al. |
| 2022/0143546 A1 | 5/2022 | Schmidt et al. |
| 2022/0144634 A1 | 5/2022 | Schmidt et al. |

FOREIGN PATENT DOCUMENTS

| | | |
|---|---|---|
| EP | 4 000 714 | 5/2022 |
| WO | WO 2012 121727 | 9/2012 |

\* cited by examiner

PROCESS AND PLANT FOR REMOVING CARBON DIOXIDE AND WATER FROM SYNTHESIS GAS

CROSS REFERENCE TO RELATED APPLICATIONS

This application claims the benefit of priority under 35 U.S.C. § 119 (a) and (b) to European Patent Application No. 22162889.4, filed Mar. 18, 2022, the entire contents of which are incorporated herein by reference.

FIELD OF THE INVENTION

The present invention relates to a process for removing carbon dioxide ($CO_2$) and water ($H_2O$) from synthesis gas, wherein the synthesis gas comprises at least hydrogen ($H_2$), carbon dioxide ($CO_2$) and water ($H_2O$). The present invention further relates to a plant for removing carbon dioxide ($CO_2$) and water ($H_2O$) from synthesis gas, wherein the synthesis gas comprises at least hydrogen ($H_2$), carbon dioxide ($CO_2$) and water ($H_2O$).

PRIOR ART

Subsequently published European patent applications EP 20 020 521 and EP 20 020 522 describe a process for producing hydrogen or synthesis gas (mixture of hydrogen and carbon monoxide) by providing a raw synthesis gas and separating the carbon dioxide occurring in the raw synthesis gas by absorption at elevated pressure in a physical absorption medium, for example methanol. The carbon dioxide-laden absorption medium is treated in a regeneration apparatus to subsequently desorb the carbon dioxide from the absorption medium as quantitatively as possible and subsequently send it on to a subsequent pressurized storage or a further use. The process is special inter glia because no hot regeneration of the laden absorption medium is required—the carbon dioxide may thus be desorbed from the laden absorption medium exclusively by pressure reduction (flashing).

The raw synthesis gas to be treated for producing hydrogen or synthesis gas in the abovementioned gas scrubbing process comprises not only carbon dioxide as a gas component to be removed but also water which is to be removed from the raw synthesis gas as quantitatively as possible to obtain pure hydrogen or pure synthesis gas.

The water present in the raw synthesis gas to be treated can also accumulate in the main absorption medium circuit for carbon dioxide removal after entry into the absorption column since it is not completely removed before entry into the absorption column. When configuring a corresponding gas scrubbing plant a low water concentration in the absorption medium, for example of less than 1% by mass, is generally assumed. Any accumulation of water in the absorption medium going beyond the concentration taken into account during configuration results in an impairment of the absorption efficiency and the selectivity of the absorption medium, thus ultimately reducing the quality of the target product (hydrogen or synthesis gas) purified in the gas scrubbing plant. This especially causes the carbon dioxide content in the product to rise and the corresponding carbon dioxide separation rate to fall.

Water is separable from methanol or other polar physical absorption media only through distillation/rectification. In the case of methanol the entire absorption medium must be evaporated as low-boiling component and exits the rectification column at the column top while the pure water fraction remains at the bottom of the column. In EP 020 521 and EP 20 020 522 a sub stream of absorption medium is withdrawn from the main absorption medium circuit and supplied to the rectification column. The water concentration in the main absorption medium circuit is relatively low. The concentration is for example 1% by mass. The mass flow of the sub stream supplied to the rectification column must therefore be relatively high to ensure complete removal of the entirety of the excess water from the absorption medium circuit via the rectification column. This results in a high energy demand and thus operating costs (OPEX) for the evaporation and recycling of the entirety of the methanol via the column top back into the main absorption medium circuit and accordingly in high installation costs (CAPEX) for an appropriately sized rectification column.

SUMMARY

It is a general object of the present invention to overcome the abovementioned disadvantages of the prior art.

It is especially an object of the present invention to reduce the energy demand in respect of operating the rectification column for removal of water that has accumulated in the absorption medium.

It is especially an object of the present invention to reduce the apparatus complexity in respect of the installation of the rectification column for removal of water that has accumulated in the absorption medium.

It is a further object of the present invention to minimize the amount of water accumulating in the main absorption medium circuit, i.e. to keep the concentration of water in the main absorption medium circuit as low as possible.

It is a further object of the present invention to improve the purity of the target product, in particular hydrogen or synthesis gas, in respect of impurities, in particular carbon dioxide, while keeping the energy demand and apparatus complexity of the relevant gas scrubbing process as low as possible.

It is a further object of the present invention to optimize the separation rate of carbon dioxide in the process while keeping the energy demand and apparatus complexity of the relevant gas scrubbing process as low as possible.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partially solved by a process for removing carbon dioxide ($CO_2$) and water ($H_2O$) from synthesis gas, wherein the synthesis gas comprises at least hydrogen ($H_2$), carbon dioxide ($CO_2$) and water ($H_2O$), comprising the steps of (a) providing a physical absorption medium, in particular methanol;

(b) supplying the synthesis gas to a scrubbing apparatus, in particular to a scrubbing column, and removing water present in the synthesis gas in the scrubbing apparatus by scrubbing the synthesis gas with absorption medium supplied to the scrubbing apparatus to obtain a synthesis gas at least partially freed of water and a mixture of absorption medium and water, wherein the synthesis gas at least partially freed of water and the mixture of absorption medium and water are withdrawn from the scrubbing apparatus;

(c) supplying the mixture of absorption medium and water to a thermal separation apparatus and thermally separating the mixture in the separation apparatus into water and absorption medium, wherein the water is withdrawn from the thermal separation apparatus and wherein the absorption medium is withdrawn from the thermal separation apparatus and subsequently supplied to the scrubbing apparatus for removing the water present in the synthesis gas according to step (b);

(d) supplying the synthesis gas at least partially freed of water to an absorption apparatus and removing carbon dioxide from the synthesis gas by physical absorption of the carbon dioxide in the absorption medium at absorption pressure in the absorption apparatus, wherein the absorption medium and the synthesis gas are run in countercurrent in the absorption apparatus to obtain an absorption medium laden at least with carbon dioxide and a synthesis gas at least partially freed of carbon dioxide and water, wherein the absorption medium laden at least with carbon dioxide and the synthesis gas at least partially freed of carbon dioxide and water are withdrawn from the absorption apparatus;

(e) removing carbon dioxide from the laden absorption medium withdrawn from the absorption apparatus by desorption of the carbon dioxide in a regeneration apparatus by pressure reduction relative to the absorption pressure, wherein desorbed carbon dioxide and at least partially regenerated absorption medium are withdrawn from the regeneration apparatus and wherein the at least partially regenerated absorption medium is recycled to the absorption apparatus for use as absorption medium according to step (d).

The synthesis gas optionally also contains carbon monoxide (CO).

According to step (d) a synthesis gas at least partially freed of carbon dioxide and water is withdrawn from the absorption apparatus. This withdrawn "synthesis gas" may in the context of the present invention also be a gas mixture which comprises hydrogen as the main component and comprises only small amounts of carbon monoxide, if any.

According to the invention a dedicated circuit for water removal is established which substantially prevents the transfer of water into the main absorption medium circuit for carbon dioxide removal. A constituent of this dedicated circuit is a scrubbing apparatus (see step (b)), to which the synthesis gas to be purified and the absorption medium are supplied. In the scrubbing apparatus the synthesis gas is at least partially freed of water. In this context "freed of water" is in particular to be understood as meaning that the water is physically dissolved by the absorption medium. The absorption medium is therefore preferably a hygroscopic absorbent, in particular methanol. The synthesis gas, i.e. raw synthesis gas, and the absorption medium are therefore run in countercurrent. One embodiment of the process according to the invention is therefore characterized in that the synthesis gas and the absorption medium are run in countercurrent in the scrubbing apparatus.

The scrubbing apparatus is configured for example as a scrubbing column and may in addition be provided with bubble cap trays, valve trays, structured packings or similar internals for improving mass transfer between the absorption medium and the raw synthesis gas. Especially when using a hygroscopic absorption medium, in particular methanol, only a small amount of absorption medium is required to achieve quantitative or virtually quantitative removal of the water from the synthesis gas to be purified.

According to step (c) the mixture of absorption medium and water obtained in the scrubbing apparatus is supplied to a thermal separation apparatus and therein thermally separated into absorption medium and water. The thermal separation apparatus is in particular a distillation apparatus, in particular a rectification apparatus. The absorption medium, in particular methanol, is especially withdrawn via the top region of the thermal separation apparatus and the water is withdrawn via the bottom region of the thermal separation apparatus.

The absorption medium withdrawn from the thermal separation apparatus is withdrawn from the thermal separation apparatus according to step (c) and subsequently supplied to the scrubbing apparatus for removing the water present in the synthesis gas according to step (b). At least a subamount of the absorption medium withdrawn from the thermal separation apparatus is supplied to the scrubbing apparatus. This defines a dedicated circuit for the removal of water by the absorption medium, thus ensuring that virtually no water can be transferred from the synthesis gas to be treated into the main absorption medium circuit. The "main absorption medium circuit" is to be understood as meaning the absorption medium circuit comprising the absorption apparatus according to step (d) and the regeneration apparatus according to step (e). The majority of the absorption medium required for absorption of carbon dioxide circulates therebetween and through these two plant components of the relevant gas scrubbing plant.

In one embodiment at least a portion of the absorption medium withdrawn from the thermal separation apparatus is subsequently supplied to the scrubbing apparatus for removal of the water present in the synthesis gas according to step (b).

As a result of the process according to the invention the thermal separation apparatus need only evaporate a markedly smaller amount of the absorption medium than in a configuration without the dedicated circuit according to the invention. The energy cost and the apparatus complexity in respect of the thermal separation apparatus is significantly reduced.

As elucidated hereinabove, in a noninventive configuration a larger portion of absorption medium must be removed from the main absorption medium circuit and treated in the thermal separation apparatus to remove water that has accumulated in the absorption medium of the main absorption medium circuit. According to the invention such an accumulation of water in the main absorption medium circuit is prevented from the outset.

The physical absorption medium is preferably methanol. Step (a) therefore preferably comprises providing methanol as the physical absorption medium. The carbon dioxide is preferably absorbed in methanol at low temperatures, in particular cryogenic temperatures, in the apparatus according to step (d). The methanol preferably has a temperature of less than $-10°$ C. or of less than $-20°$ C. or of less than $30°$ C. or of less than $-40°$ C. before entry into the absorption apparatus. The methanol preferably has a temperature of more than $-60°$ C. or of more than $-50°$ C. before entry into the absorption apparatus.

The absorption apparatus is for example configured as an absorption column and is operated at absorption pressure.

Absorption pressure is elevated pressure in particular a pressure markedly above ambient pressure, in particular a pressure of more than 20 bar or more than 30 bar, for example from 20 to 80 bar, preferably 30 to 70 bar, more preferably 35 to 55 bar, more preferably 35 to 45 bar.

According to step (e) carbon dioxide is desorbed in the regeneration apparatus by pressure reduction relative to the absorption pressure and thus released again from the absorption medium laden with at least carbon dioxide. The regeneration apparatus preferably comprises a plurality of serially arranged flash stages. The flash stages are serially arranged and configured for example as flash columns or flash vessels. "Serially arranged" is to be understood as meaning in particular that the plurality of flash stages are connected successively and are in fluid communication with one another, in particular two immediately successive flash stages are in fluid communication. The pressure in a flash stage is lower than the absorption pressure and is preferably reduced from flash stage to flash stage in the flow direction of the absorption medium. The pressure in a downstream flash stage is thus in principle lower than the pressure in the flash stage arranged upstream of the flash stage.

The last of the serially arranged flash stages is preferably operated at negative pressure (vacuum). In one example the last of the serially arranged flash stages is at a pressure of 0.1 to 0.9 bar, preferably of 0.1 to 0.5 bar, more preferably of 0.2 bar. "Negative pressure" is to be understood as meaning a pressure lower than ambient pressure. The use of negative pressure in the last flash stage maximizes the yield of desorbed carbon dioxide and maximizes the capacity of the at least partially regenerated absorption medium for reabsorption of carbon dioxide into the absorption apparatus.

The synthesis gas supplied to the scrubbing apparatus according to step (b) and subsequently to the absorption apparatus according to step (d) is the synthesis gas or raw synthesis gas to be purified. This is produced by processes known to those skilled in the art. Examples include steam reforming (SMR), autothermal reforming (ATR), gas heated reforming (GHR) and combinations of the aforementioned. These processes produce a synthesis gas which comprises at least the constituents hydrogen (H2) and carbon monoxide (CO) as well as the undesired constituents carbon dioxide (CO2) and water (H2O). The process for synthesis gas production is preferably autothermal reforming. Autothermal reforming is generally chosen for producing synthesis gas when particularly high gas capacities are required. In such cases the removal of the carbon dioxide by physical absorption is often economically more advantageous than a process for chemical absorption of the carbon dioxide, for example an amine scrubbing.

The primarily produced synthesis gas is preferably subjected to a water gas shift reaction in a subsequent step to increase the yield of hydrogen. By converting the carbon monoxide to carbon dioxide in the course of the water gas shift reaction the synthesis gas supplied to the absorption apparatus contains hydrogen and carbon dioxide as its main components. As a result of separating the carbon dioxide and water from the synthesis gas in the course of the process according to the invention, step (d) in this case preferably comprises withdrawing from the absorption apparatus a "synthesis gas" freed of carbon dioxide and water which comprises hydrogen as its main constituent. Such a raw hydrogen product may be supplied for example to a pressure swing adsorption process (PSA) for further workup to obtain pure hydrogen.

One embodiment of the process according to the invention is characterized in that a subamount of the at least partially regenerated absorption medium withdrawn from the regeneration apparatus is supplied to the scrubbing column for removal of water present in the synthesis gas.

In addition to the absorption medium withdrawn from the thermal separation apparatus this embodiment also comprises supplying a subamount of the absorption medium withdrawn from the regeneration apparatus to the scrubbing apparatus to remove water therein. The water withdrawn from the thermal separation apparatus according to step (c) may be contaminated with absorption medium which can lead to absorption medium losses in the dedicated circuit for water removal. Supplying regenerated absorption medium advantageously compensates these losses. Furthermore, a certain amount of absorption medium may pass into the absorption apparatus due to the flow in the scrubbing apparatus through entrainment of the absorption medium with the synthesis gas. Supplying absorption medium to the dedicated circuit for water removal also compensates this loss in respect of the mass balance in the circuit.

One embodiment of the process according to the invention is characterized in that prior to being supplied to the scrubbing apparatus the synthesis gas is cooled to below the dew point of water with the result that water condensed out of the synthesis gas is separated in a separation apparatus and supplied to the thermal separation apparatus.

As a result, the amount of water supplied to the scrubbing apparatus via the synthesis gas to be purified is already markedly reduced in a preceding step. Less absorption medium for removing the water is therefore required in the scrubbing apparatus. This further reduces the cost and complexity for separation of absorption medium from water in the thermal separation apparatus.

The abovementioned embodiment in particular comprises a cooling step for condensing water from the synthesis gas to be purified, preferably in a heat exchanger, and a separation step for separating the condensed water from the gaseous synthesis gas, in particular in a separation apparatus, for example a separator.

The synthesis gas is accordingly withdrawn from the separation apparatus and the synthesis gas withdrawn from the separation apparatus is supplied to the scrubbing apparatus for further removal of water present in the synthesis gas, in particular for further removal of water present in the synthesis gas according to step (b).

One embodiment of the process according to the invention is characterized in that absorption medium withdrawn from the thermal separation apparatus is gaseous and is cooled to below the dew point of the absorption medium before it is supplied to the scrubbing apparatus.

One embodiment of the process according to the invention is characterized in that a sub stream of the absorption medium withdrawn from the thermal separation apparatus is utilized in gaseous form as stripping medium for removal of carbon dioxide from the laden absorption medium in the regeneration apparatus.

Instead of being condensed and supplied to the scrubbing apparatus a portion of the absorption medium withdrawn from the thermal separation apparatus may also be used as a stripping medium or stripping auxiliary to expel carbon dioxide in the regeneration apparatus. This makes it possible to further increase the amount of separated carbon dioxide, i.e. the efficiency of desorption in the regeneration apparatus, without additional energy demand. It is a further advantage that the absorption medium vapours withdrawn from the thermal separation apparatus are chemically identical to the absorption medium. Accordingly, no "foreign" stripping medium that would require subsequent complex removal from the stripped carbon dioxide, for example nitrogen, is introduced into the absorption medium. Entrained absorption medium vapors are easy to remove from carbon dioxide by condensation and separation. By contrast, if nitrogen is used as an otherwise customary stripping auxiliary this is subsequently separable from carbon dioxide only with difficulty. This would severely limit the the possible uses of carbon dioxide as a product or would impede storage thereof.

One embodiment of the process according to the invention is characterized in that the process comprises no hot regeneration step for regenerating the laden absorption medium.

With the exception of the aforementioned embodiment the process according to the invention has the feature that exclusively pressure reduction (flashing) relative to the absorption pressure is used for desorption of carbon dioxide in the regeneration apparatus according to step (e). In particular the process according to the invention requires no hot regeneration step customary for complete regeneration of the absorption medium in gas scrubs as a last regeneration step where the absorption medium is for example entirely heated to boiling point using a reboiler. In such a hot regeneration step the absorption medium vapours act as a stripping auxiliary.

One embodiment of the process according to the invention is characterized in that a subamount of the at least partially regenerated absorption medium withdrawn from the regeneration apparatus is supplied to the thermal separation apparatus, wherein water residues are removed from the absorption medium by scrubbing with the at least partially regenerated absorption medium in the thermal separation apparatus before the absorption medium is withdrawn from the thermal separation apparatus according to step (c). The at least partially regenerated absorption medium is supplied to the thermal separation apparatus in its top region.

The size of the subamount of the at least partially regenerated absorption medium supplied to the thermal separation apparatus depends on the amount of water present in the synthesis gas.

The gaseous absorption medium produced by thermal separation in the thermal separation apparatus still contains residues of water that cannot be completely removed by the relevant thermal separation process, for example rectification. To prevent entrainment of water into the scrubbing apparatus these residues are advantageously removed by back-extraction with the at least partially regenerated absorption medium in the thermal separation apparatus. Said back-extraction may further be facilitated by addition of regenerated absorption medium at the top region of the thermal separation apparatus. A further advantage results from this embodiment in conjunction with the abovementioned embodiment in which gaseous absorption medium withdrawn from the thermal separation apparatus is utilized as stripping medium in the regeneration apparatus. This prevents entrainment of water into the main absorption medium circuit, in this case via the regeneration apparatus.

Advantages and effects described for aforementioned process features of the invention apply equally to the plant features which follow, at least for technically equivalent apparatus features.

The objects of the invention are further at least partially achieved by a plant for removing carbon dioxide ($CO_2$) and water ($H_2O$) from synthesis gas, wherein the synthesis gas comprises at least hydrogen ($H_2$), carbon dioxide ($CO_2$) and water ($H_2O$), comprising the following plant components in operative connection with one another:

(a) means for providing a physical absorption medium, in particular methanol;

(b) a scrubbing apparatus, in particular a scrubbing column, and means for supplying the synthesis gas and for supplying absorption medium to the scrubbing apparatus, wherein the scrubbing apparatus is configured for removing water present in the synthesis gas by scrubbing the synthesis gas with absorption medium, thus making it possible to obtain in the scrubbing apparatus a synthesis gas at least partially freed of water and a mixture of absorption medium and water, and means for withdrawing the synthesis gas at least partially freed of water and the mixture of absorption medium and water from the scrubbing apparatus;

c) a thermal separation apparatus and means for supplying the mixture of absorption medium and water to the thermal separation apparatus, wherein the mixture of absorption medium and water is separable into water and absorption medium in the separation apparatus, and means for withdrawing the water from the thermal separation apparatus and means for withdrawing the absorption medium from the thermal separation apparatus and for supplying the absorption medium to the scrubbing apparatus according to (b) to remove the water present in the synthesis gas in the scrubbing apparatus;

(d) an absorption apparatus and means for supplying the synthesis gas at least partially freed of water to the absorption apparatus, wherein the absorption apparatus is configured such that carbon dioxide is removable from the synthesis gas by physical absorption of the carbon dioxide in the absorption medium at absorption pressure and wherein the absorption medium and the synthesis gas may be run in countercurrent in the absorption apparatus, thus making it possible to obtain an absorption medium laden at least with carbon dioxide and a synthesis gas at least partially freed of carbon dioxide and water, and means for withdrawing the absorption medium laden at least with carbon dioxide and the synthesis gas at least partially freed of carbon dioxide and water from the absorption apparatus;

(e) a regeneration apparatus, wherein the regeneration apparatus is configured for removing carbon dioxide from the laden absorption medium withdrawable from the absorption apparatus by desorption of the carbon dioxide by pressure reduction relative to the absorption pressure, thus making it possible to obtain an at least partially regenerated absorption medium, means for withdrawing the desorbed carbon dioxide and the at least partially regenerated absorption medium from the regeneration apparatus and means for recycling the at least partially regenerated absorption medium to the absorption apparatus according to (d) for use as absorption medium.

One embodiment of the plant according to the invention is characterized in that the plant comprises means for supplying a subamount of the at least partially regenerated absorption medium withdrawable from the regeneration apparatus to the scrubbing column for removal of water present in the synthesis gas.

One embodiment of the plant according to the invention is characterized in that upstream of the scrubbing apparatus in the flow direction of the synthesis gas a heat exchanger and a separation apparatus, in particular a liquid separator, are arranged successively, wherein the heat exchanger is configured for cooling the synthesis gas to below the dew point of water and the separation apparatus is configured for separating the condensed-out water from the synthesis gas and wherein the plant comprises means for supplying the water condensed out in the separation apparatus to the thermal separation apparatus.

One embodiment of the plant according to the invention is characterized in that the plant comprises means for withdrawing synthesis gas from the separation apparatus and means for supplying the synthesis gas withdrawable from the separation apparatus to the scrubbing apparatus for further removal of water present in the synthesis gas.

One embodiment of the plant according to the invention is characterized in that the plant comprises means for cooling gaseous absorption medium withdrawable from the thermal separation apparatus, wherein the means are configured such that the absorption medium is coolable to below the dew point of the absorption medium.

One embodiment of the plant according to the invention is characterized in that the plant comprises means for withdrawing gaseous absorption medium from the thermal separation apparatus and means for supplying the gaseous absorption medium to the regeneration apparatus as stripping medium for removal of carbon dioxide from the laden absorption medium in the regeneration apparatus by stripping.

One embodiment of the process according to the invention is characterized in that the plant comprises no means for hot regeneration of the laden absorption medium.

One embodiment of the plant according to the invention is characterized in that the plant comprises means for withdrawing a subamount of the at least partially regenerated absorption medium withdrawable from the regeneration apparatus and means for supplying the at least partially regenerated absorption medium to the thermal separation apparatus, thus making it possible to remove water residues from the absorption medium by scrubbing with the at least partially regenerated absorption medium in the thermal separation apparatus, wherein the plant comprises means for withdrawing the absorption medium freed of water residues from the thermal separation apparatus.

BRIEF DESCRIPTION OF THE DRAWINGS in the working examples which follow the invention will now be more particularly elucidated with reference to the figures. The figures illustrate exemplary embodiments of the invention without limiting the extent of these.

In the Figures.

In the figures identical elements are provided with identical reference numerals. Gas streams are shown as dashed lines while liquid streams are shown as solid lines. Arrow tips indicate the flow direction of the particular stream. The absorption medium is methanol.

DETAILED DESCRIPTION OF PREFERRED EMBODIMENTS

Figure 1:
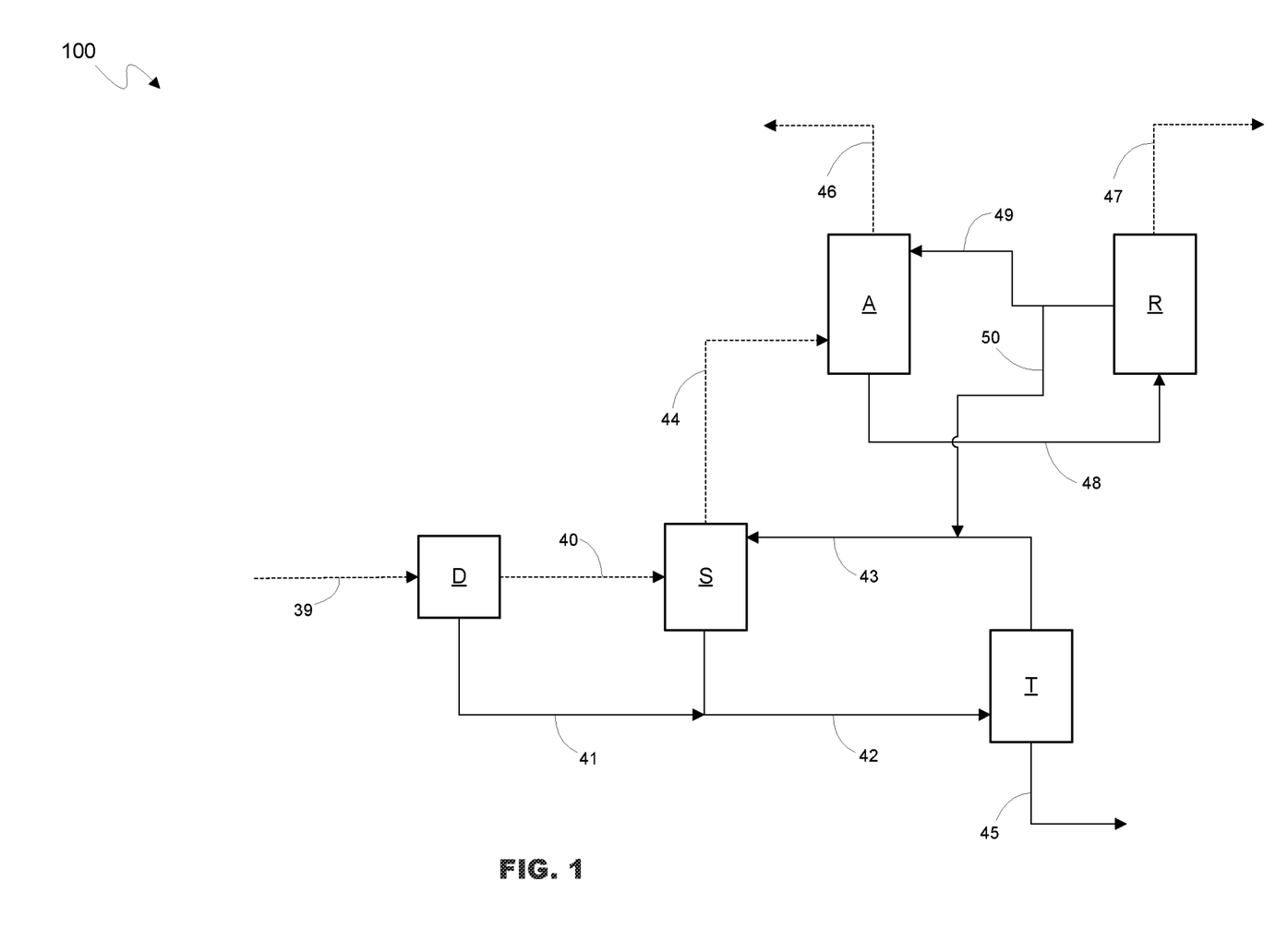
FIG. 1 shows a highly simplified block flow diagram of a process or a plant for an exemplary embodiment of the invention.

FIG. 1 shows a highly simplified block flow diagram of a process 100 or a plant for an exemplary embodiment of the invention. The highly simplified block flow diagram of FIG. 1 is suitable for illustrating the essential elements of the invention.

A synthesis gas to be purified, for example a shifted synthesis gas from an autothermal reformer, comprising the main constituents hydrogen and carbon dioxide is provided via conduit 39 and initially introduced into a separation apparatus D. The separation apparatus D comprises cooler and a separator for condensing water out of the synthesis gas. The synthesis gas depleted in water is sent on via conduit 40 and introduced into a scrubbing apparatus S. Water condensed in the separation apparatus D is withdrawn therefrom via conduit 41. The scrubbing apparatus S, in the form of a scrubbing column having bubble cap trays for example, is supplied with cold, liquid methanol via conduit 43. In the scrubbing apparatus S the synthesis gas to be purified which is already depleted in water flows from bottom to top and the cold methanol flows from top to bottom. Through mutual mass transfer in scrubbing apparatus S the water remaining in the synthesis gas is very largely dissolved by the methanol. Accordingly a mixture of methanol and water exits the bottom region of the scrubbing apparatus S via conduit 42 and is combined with water from conduit 41. The methanol-water mixture in conduit 42 is supplied to a thermal separation apparatus T in the form of a rectification column for example. Methanol and water are largely thermally separated in the thermal separation apparatus T. Water, which has a higher boiling point than methanol, exits the bottom region of the thermal separation apparatus T via conduit 45 and is subjected to a further workup (not shown). Methanol, which has a lower boiling point than water, exits the top region of the thermal separation apparatus via conduit 43 in the gaseous state. This gaseous methanol is cooled markedly below its dew point (not shown) and is subsequently supplied to the scrubbing apparatus S in cold and liquid form as specified above. The water introduced into the process via conduit 40 thus circulates in the circuit defined by conduits 42 and 43 and thus cannot pass into other regions of the plant provided that quantitative removal of the water is achieved in the scrubbing apparatus.

The synthesis gas largely freed of water is withdrawn from the scrubbing apparatus 44 via conduit 44 and subsequently enters an absorption apparatus A, in the form of a multistage absorption column for example, at a pressure of about 40 bar. In the absorption apparatus A the synthesis gas to be purified and the absorption medium are run in countercurrent, wherein the synthesis gas flows from bottom to top and the absorption medium flows from top to bottom. Accordingly, absorption medium enters an upper region of the absorption apparatus via conduit 49 and the synthesis gas to be purified enters the absorption apparatus A in a lower region via conduit 44. The synthesis gas is largely freed of carbon dioxide in the absorption apparatus A. Accordingly, the "synthesis gas" largely freed of carbon dioxide which now comprises hydrogen as the main component is discharged from the absorption apparatus A via conduit 46. Carbon dioxide-laden methanol is withdrawn from the absorption apparatus via conduit 48 and subsequently enters a regeneration apparatus R. The regeneration apparatus R comprises, for example, a plurality of serially arranged flash stages, for example three flash stages. The regeneration apparatus R preferably comprises no hot regeneration stage in which the absorption medium is heated to boiling point. In the regeneration apparatus R carbon dioxide is largely desorbed from the laden methanol by pressure reduction relative to the absorption pressure. The last flash stage in the regeneration apparatus R is preferably in the form of a vacuum flash stage to expel the carbon dioxide from the laden methanol as completely as possible. The expelled (desorbed) carbon dioxide exits the regeneration apparatus R via conduit 47 and is subsequently subjected either to a further use or to storage (not shown). Prior to the further use or storage the carbon dioxide is compressed to a pressure required therefor as required.

The methanol largely freed of carbon dioxide, i.e. regenerated methanol, is withdrawn from the regeneration apparatus via conduit 49 and subsequently supplied to the absorption apparatus A for reabsorption of carbon dioxide.

A small sub stream of the regenerated methanol in conduit 49 is diverted via conduit 50 and supplied to conduit 43. The separation of methanol and water in the thermal separation apparatus T is never complete. The water withdrawn via conduit is therefore contaminated with methanol, thus resulting in methanol losses in the circuit defined by conduits 42 and 43 and the scrubbing apparatus S and the thermal separation apparatus T. These methanol losses are compensated by supplying regenerated methanol via conduit 50.

Figure 2:
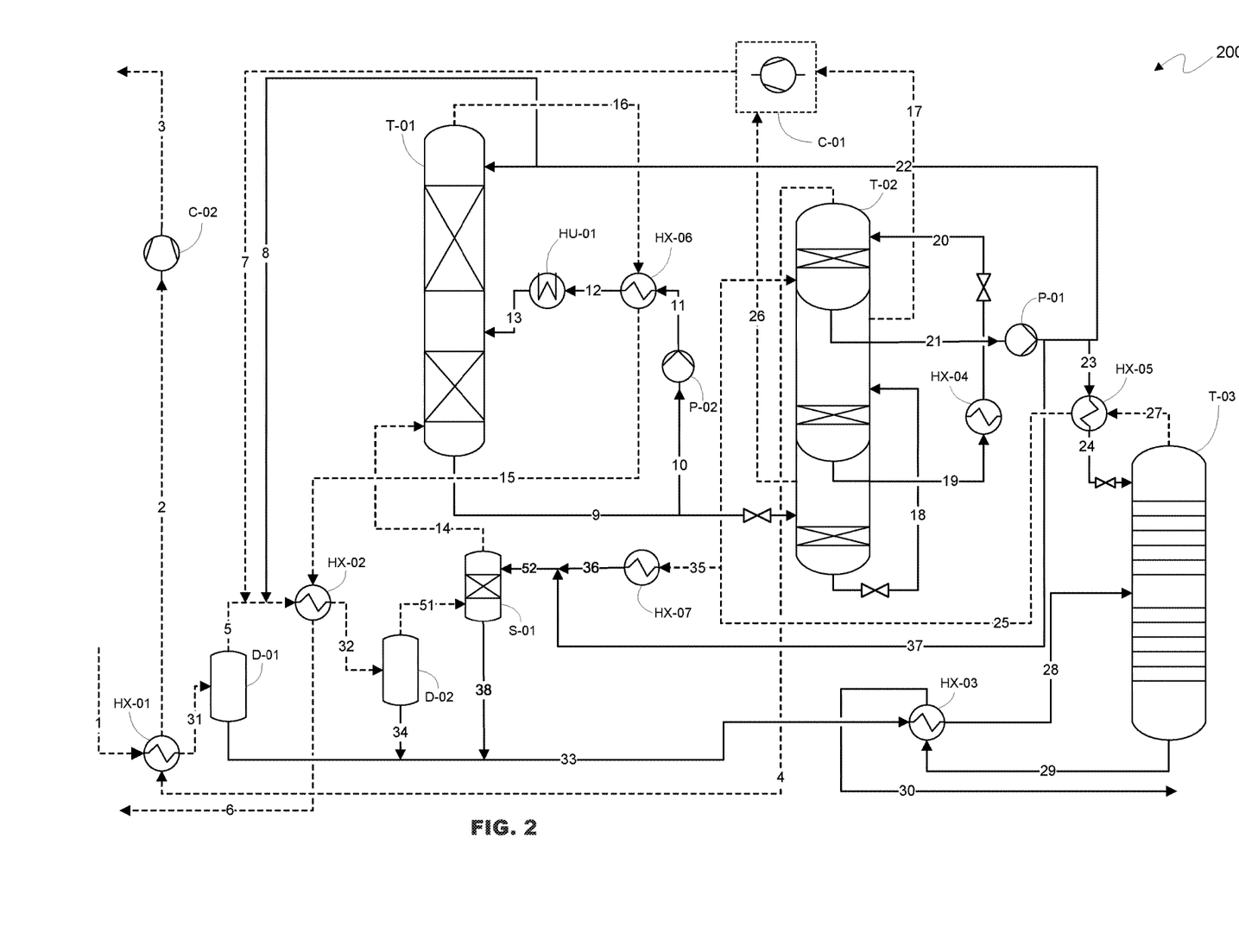
FIG. 2 shows a process flow diagram of a process or a plant for an exemplary embodiment of the invention and FIG. 3 shows a process flow diagram of a process or a plant without the inventive dedicated circuit for water removal.

FIG. 2 shows a process flow diagram of a process 200 or a plant for an exemplary embodiment of the invention which shows additional details compared to the highly simplified block flow diagram of FIG. 1.

Synthesis gas from a reformer unit which has been treated in a water gas shift unit arranged downstream of the reformer unit (both not shown) and which is to be purified is supplied via conduit 1 and initially cooled to below the dew point of water in heat exchanger HX-01 using a carbon dioxide stream from conduit 4. The cooled synthesis gas is subsequently sent on via conduit 31 and condensed water is separated from the synthesis gas in separator D-01. Synthesis gas and uncondensed water are sent on via conduit 5 and in heat exchanger HX-02 further cooled to a temperature of −10° C. against purified synthesis gas from conduit 15. To prevent the formation of ice in conduit 5 and downstream thereof methanol is supplied via conduit 8. Synthesis gas cooled to −10° C. in heat exchanger HX-02 is sent on via conduit 32 and in separator D-02 a further amount of water is separated from the synthesis gas and supplied via conduit 34 to the conduit 33.

The synthesis gas cooled and partially freed of water by condensation and separation is sent on via conduit 51 and introduced into the scrubbing column S-01. The scrubbing column S-01 is provided with bubble cap trays. In the scrubbing column S-01 the synthesis gas to be purified flows from bottom to top while cold methanol introduced via conduit 52 flows from top to bottom. The mutual mass transfer between the synthesis gas and the methanol causes water remaining in the synthesis gas to be virtually quantitatively dissolved in the scrubbing column S-01. Accordingly a mixture of methanol and water is withdrawn from the bottom region of the scrubbing column S-01 via conduit 38 and supplied to conduit 33 which conducts water from the separators D-01 and D-02.

The synthesis gas is practically completely freed of water is withdrawn from the scrubbing column S-01 via conduit 14 and supplied to an absorption column T-01 in which it is subjected to a physical absorption step for removal of carbon monoxide. Absorption column T-01 is operated at an absorption pressure of 40 bar. In absorption column T-01 cold methanol from conduits 13 and 22 is run from top to bottom as absorption medium while the synthesis gas from conduit 14 is run from bottom to top in countercurrent. In the course of the mass transfer between synthesis gas and methanol carbon dioxide is predominantly absorbed in methanol while smaller amounts of value gases, in the present case predominantly hydrogen, are unavoidably co-absorbed in methanol. Purified synthesis gas, i.e. synthesis gas largely freed of water and carbon dioxide, is withdrawn from the absorption column T-01 via conduit 16. The synthesis gas subsequently cools a subamount of laden methanol diverted from conduit 9 using pump P-02 from conduit 10 and sent on via conduit 11 in heat exchanger HX-06. The purified synthesis gas is subsequently sent on via conduit 15 and in heat exchanger HX-02 cools the still largely untreated synthesis gas from conduit 5. The purified synthesis gas is subsequently withdrawn from the process via conduit 6. It is optionally supplied to further purification step, for example a pressure swing adsorption (PSA) plant for production of pure hydrogen. The pure hydrogen may subsequently be sent for a further use, for example a plant for methanol or ammonia synthesis (not shown).

In the bottom region of the absorption column T-01 laden methanol is withdrawn via conduit 9. The laden methanol contains carbon dioxide and relatively small amounts of co-absorbed value gases, in particular hydrogen, as absorbed gas components. A portion of the laden methanol is diverted from conduit 9 via conduit 10 using pump P-02, sent on via conduit 11 and in heat exchanger HX-06 cooled against purified synthesis gas from conduit 16. It is subsequently sent on via conduit 12 and cooled to −35° C. in refrigerant evaporator HU-01. The cooled laden methanol is subsequently sent on via conduit 13 and for reabsorption of carbon dioxide introduced into absorption column T-01 where it is mixed with regenerated methanol from conduit 22.

The majority of the laden methanol is introduced into a flash column T-02 via conduit 9. The pressure is initially reduced to 18 bar via the pressure reduction valve arranged in conduit 9. This pressure reduction initially liberates essentially co-absorbed value gases, in particular hydrogen, in the lower portion of the flash column in a first flash step. These are withdrawn via conduit 26 and supplied to compressor C-01. Laden methanol decompressed to 18 bar is sent on via conduit 18 and decompressed to 8 bar via the pressure reduction valve arranged in conduit 18. In the middle portion of the flash column this further pressure reduction brings about in a second flash step further liberation of essentially co-absorbed value gases (carbon monoxide and hydrogen) which are withdrawn via conduit 17 and likewise sent to compressor C-01. Compressor C-01 compresses the value gases from conduits 17 and 26 to absorption pressure (40 bar). The compressed value gases are subsequently recycled into the absorption column T-01 via conduits 7, 5, 32, 51 and 14.

The methanol withdrawn from the second flash stage via conduit 19 is in heat exchanger HX-04 heated using a portion of the raw synthesis gas from conduit 1 (not shown) and via conduit 20 sent to a third flash stage in the upper portion of the flash column. The third flash stage is a flash stage arranged downstream of the first and second flash stage. Arranged in conduit 20 is a further pressure reduction valve which decompresses the laden methanol primarily containing carbon dioxide as absorbed gas components to 1.3 bar.

The third flash stage is supplied via conduit 25 with methanol vapors from a rectification column T-03 which are withdrawn from the top region of the rectification column T-03 via conduit 27 and initially cooled slightly in a heat exchanger HX-05 without reaching the dew point. The methanol vapours sent on via conduit 25 and introduced into the third flash stage are used as stripping medium in this third flash stage to increase the amount of the carbon dioxide expelled (desorbed) from the absorption medium in the third flash stage relative to a pure flash arrangement. The third flash stage may thus also be considered a stripping stage, wherein methanol vapours are used as stripping medium. It is alternatively also possible to eschew introduction of the methanol vapours and operate the third flash stage at negative pressure (vacuum) to increase the amount of desorbed carbon dioxide/reduce the residual amount of absorbed carbon dioxide in the regenerated methanol. A combination of both, i.e. utilization of negative pressure and utilization of methanol vapours as stripping medium, is likewise possible.

The carbon dioxide desorbed in the third flash stage is withdrawn from this flash stage via conduit 4. It has a low temperature of −36° C. and is therefore utilized for cooling the raw synthesis gas from conduit 1 in heat exchanger HX-01. The carbon dioxide product is sent on via conduit 2 and compressed by compressor C-02. The compressed carbon dioxide may subsequently be stored (CCS) or sent to a further use (CCU).

The methanol obtained in the third flash stage comprises only a low residual content of absorbed carbon dioxide. It is withdrawn from the third flash stage via conduit 21 and compressed to absorption pressure (40 bar) using pump P-01. It is subsequently sent on via conduit 22 and supplied to the top region of the absorption column T-01 for reabsorption of carbon dioxide.

A portion of the methanol vapors withdrawn from the rectification column are not introduced into the flash column T-02 via conduit 25 as stripping medium but rather diverted via conduit 35 and cooled to below the dew point of methanol in heat exchanger HX-07. The condensed methanol sent on via conduit 36 and combined with regenerated methanol from conduit 37. The resulting methanol stream is sent on via conduit 52 and introduced into scrubbing column S-01 in an upper region. In the case of process 200 of FIG. 2, conduits 27, 35, 36, 52, 38, 28 and parts of conduits 25 and 33, rectification column T-03, heat exchangers HX-07 and HX-03 and scrubbing column S-01 thus form the above-described dedicated circuit for removal of water from the synthesis gas to be purified.

The mixture of methanol and water conducted via conduit 33 is supplied to a middle region of rectification column T-03. The mixture in conduit 33 is formed from the water separated in separators D-01 and D-02 and from the water-methanol mixture withdrawn from the bottom region of the scrubbing column S-01. Said mixture is supplied via conduit 33 and is in heat exchanger HX-03 initially heated against hot water exiting the rectification column T-03 as bottoms product via conduit 29. Rectification column T-03 is further heated with fresh steam via a boiler (not shown). The rectification column T-03 essentially effects separation of methanol and water, wherein the methanol vapors exit the rectification column T-03 as tops product via conduit 27 as described above. This separated water exits the rectification column T-03 from its bottom region via conduit 29, is cooled in heat exchanger HX-03 and discharged from the process via conduit 30 for workup (not shown). Since this water is contaminated with methanol it is necessary to introduce a smaller amount of regenerated methanol into the dedicated circuit more particularly described above to equalize the mass balance. This is achieved by diverting a sub stream of regenerated methanol from conduit 21 via conduit 37 and combining this sub stream with the stream in conduit 36 to afford the stream in conduit 52.

The methanol vapours produced in the top region of the thermal separation apparatus may still contain residues of water. A small subamount of regenerated methanol is therefore diverted from conduit 21 and, via conduit 23, heat exchanger HX-05 and conduit 24 and after decompression, introduced into a rectification column T-03 for back-extraction of the small residual amounts of water. This prevents water from being entrained into the flash column T-02 via conduits 25 and 26 and thus entrained into the main absorption medium circuit.

The following table reports a numerical example for two embodiments of the invention. The data reported are simulation data determined using AspenPlus® software. The carbon dioxide amount to be removed and the water concentration in the synthesis gas are the same in both Examples 1 and 2.

Example 1 corresponds to the process mode of FIG. 2. Accordingly not only the methanol withdrawn from the rectification column T-03 via conduit 27 and subsequently supplied to the scrubbing column S-01 via conduit 36 but also regenerated methanol via conduit 37 are supplied to the scrubbing column S-01. The sum of the streams from conduits 36 and 37 is supplied to the scrubbing column S-01 via conduit 52. Example 2 lacks the additional methanol stream according to conduit 37, i.e. the scrubbing column S-01 is supplied with methanol from the rectification column T-03 (conduit 36) alone. The table further reports the volume flow of conduit 21 which corresponds to the volume flow in the main absorption medium circuit.

| Flow in conduit no. | Description | Example 1 (kmol/hr) | Example 2 (kmol/hr) |
| --- | --- | --- | --- |
| 37 | Additional methanol stream for dedicated circuit for water removal | 33 | 0 |
| 36 | Methanol stream for dedicated circuit for water removal | 63 | 150 |
| 21 | Methanol stream in main absorption medium circuit | 56994 | 62304 |

Figure 3:
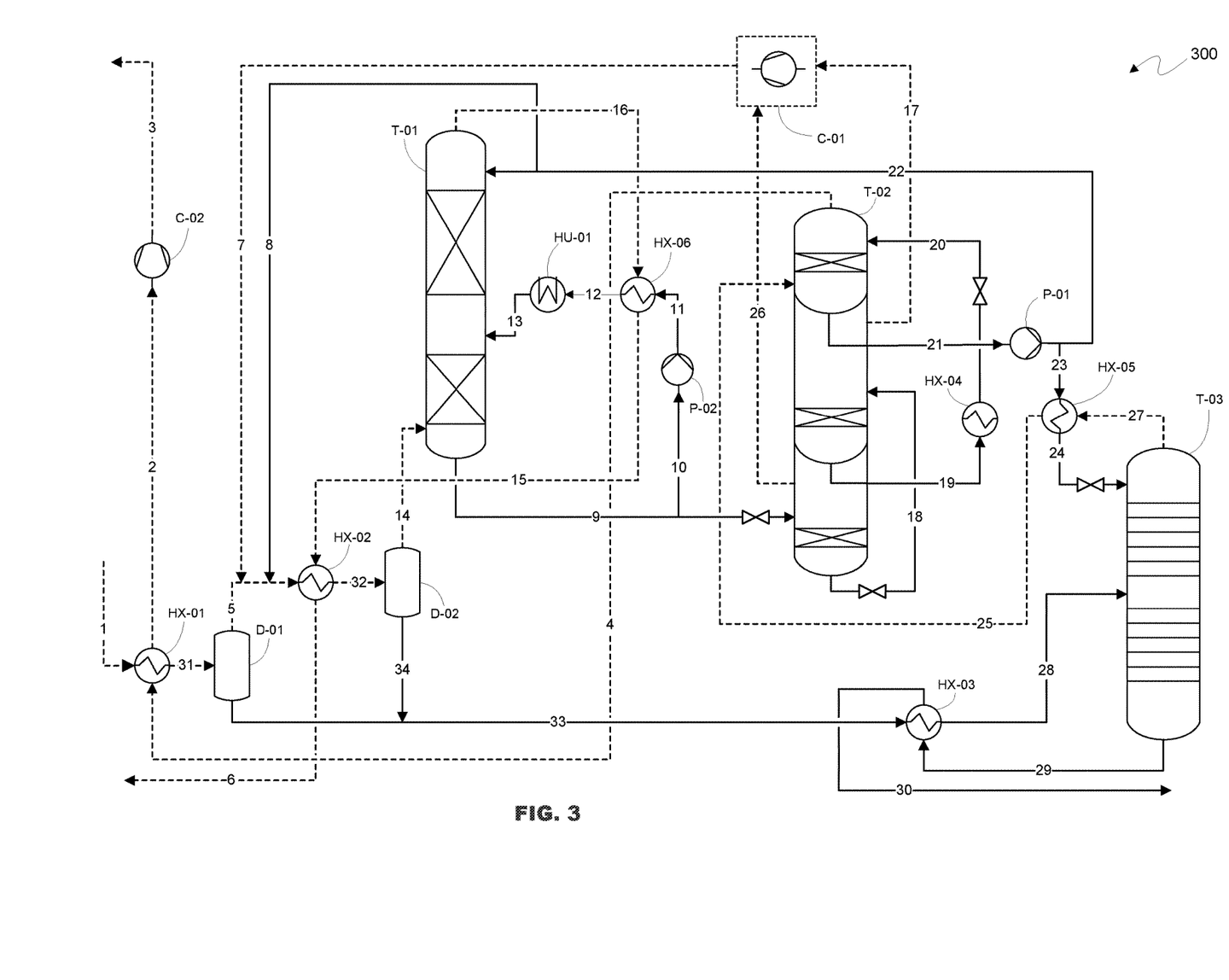

FIG. 3 shows a process flow diagram of a process 300 or a plant without an inventive dedicated circuit for water removal.

The water present in the synthesis gas to be purified is not completely removed in the separators D-01 and D-02. Due to the lack of the scrubbing apparatus S-01 in the corresponding circuit this uncondensed, unseparated water is inevitably introduced into the absorption column T-01 via conduit 14. This has the result that as a result of the constant inflow via conduit 14 water can accumulate in the main absorption medium circuit which is substantially formed by the absorption column T-01, the flash column T-02 and the connecting conduits. This causes the absorption capacity of the methanol to fall while the specificity thereof for the gas component mainly to be removed also deteriorates.

Due to accumulation of water in the methanol in the main absorption medium circuit a significant portion of the regenerated methanol from conduit 21 is diverted and via conduit 23 initially heated against hot methanol vapours from conduit 27 in heat exchanger HX-05. The amount of the methanol withdrawn via conduit 23 is adjusted such that water cannot accumulate in the methanol in the circuit between absorption column T-01 and the flash column, i.e. a predefined threshold concentration is not exceeded. Operation of the process with water-free methanol in the main absorption medium circuit is nevertheless impossible. The regenerated methanol is subsequently supplied via conduit 24 to an upper region of the rectification column T-03. Arranged in conduit 24 is a pressure reduction valve through which the methanol is decompressed to 2 bar. As a result of this process mode the amount of the methanol-water mixture to be processed in rectification column T-03 according to process 300 is substantially larger than the amount of the mixture processed in rectification column T-03 according to process 200. The energy costs and apparatus complexity are thus significantly higher in this respect according to process 300.

| List of Reference Symbols | |
|---|---|
| 100, 200, 300 | Process |
| 1 to 52 | Conduit |
| A | Absorption apparatus |
| D | Separation apparatus |
| R | Regeneration apparatus |
| S | Scrubbing apparatus |
| T | Thermal separation apparatus |
| HX-01 to HX-07 | Heat exchanger |
| HU-01 | Refrigerant evaporator |
| D-01, D-02 | Separator |
| S-01 | Scrubbing column |
| T-01 | Absorption column |
| T-02 | Flash column |
| T-03 | Rectification column |
| P-01, P-02 | Pump |
| C-01, C-02 | Compressor |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for removing carbon dioxide and water from synthesis gas, wherein the synthesis gas comprises at least hydrogen, carbon dioxide and water, comprising the steps of:
   (a) providing a physical absorption medium;
   (b) supplying the synthesis gas to a scrubbing apparatus and removing water present in the synthesis gas in the scrubbing apparatus by scrubbing the synthesis gas with absorption medium supplied to the scrubbing apparatus to obtain a synthesis gas at least partially freed of water and a mixture of absorption medium and water, wherein the synthesis gas at least partially freed of water and the mixture of absorption medium and water are withdrawn from the scrubbing apparatus;
   (c) supplying the mixture of absorption medium and water to a thermal separation apparatus and thermally separating the mixture in the separation apparatus into water and absorption medium, wherein the water is withdrawn from the thermal separation apparatus and wherein the absorption medium is withdrawn from the thermal separation apparatus and subsequently supplied to the scrubbing apparatus for removing the water present in the synthesis gas according to step (b);
   (d) supplying the synthesis gas at least partially freed of water to an absorption apparatus and removing carbon dioxide from the synthesis gas by physical absorption of the carbon dioxide in the absorption medium at absorption pressure in the absorption apparatus, wherein the absorption medium and the synthesis gas are run in countercurrent in the absorption apparatus to obtain an absorption medium laden at least with carbon dioxide and a synthesis gas at least partially freed of carbon dioxide and water, wherein the absorption medium laden at least with carbon dioxide and the synthesis gas at least partially freed of carbon dioxide and water are withdrawn from the absorption apparatus;
   (e) removing carbon dioxide from the laden absorption medium withdrawn from the absorption apparatus by desorption of the carbon dioxide in a regeneration apparatus by pressure reduction relative to the absorption pressure, wherein desorbed carbon dioxide and at least partially regenerated absorption medium are withdrawn from the regeneration apparatus and wherein the at least partially regenerated absorption medium is recycled to the absorption apparatus for use as absorption medium according to step (d).

2. The process according to claim 1, wherein a subamount of the at least partially regenerated absorption medium withdrawn from the regeneration apparatus is supplied to the scrubbing column for removal of water present in the synthesis gas.

3. The process according to claim 1, wherein the synthesis gas and the absorption medium are run in countercurrent in the scrubbing apparatus.

4. The process according to claim 1, wherein prior to being supplied to the scrubbing apparatus the synthesis gas is cooled to below the dew point of water with the result that water condensed out of the synthesis gas is separated in a separation apparatus and supplied to the thermal separation apparatus.

5. The process according to claim 4, wherein synthesis gas is withdrawn from the separation apparatus and the synthesis gas withdrawn from the separation apparatus is supplied to the scrubbing apparatus for further removal of water present in the synthesis gas.

6. The process according to claim 1, wherein absorption medium withdrawn from the thermal separation apparatus is gaseous and is cooled to below the dew point of the absorption medium before it is supplied to the scrubbing apparatus.

7. The process according to claim 1, wherein a sub stream of the absorption medium withdrawn from the thermal separation apparatus is utilized in gaseous form as stripping medium for removal of carbon dioxide from the laden absorption medium in the regeneration apparatus.

8. The process according to claim 1, wherein the process comprises no hot regeneration step for regenerating the laden absorption medium.

9. The process according to claim 1, wherein a subamount of the at least partially regenerated absorption medium withdrawn from the regeneration apparatus is supplied to the thermal separation apparatus, wherein water residues are removed from the absorption medium by scrubbing with the at least partially regenerated absorption medium in the thermal separation apparatus before the absorption medium is withdrawn from the thermal separation apparatus according to step (c).

10. A plant for removing carbon dioxide and water from synthesis gas, wherein the synthesis gas comprises at least hydrogen, carbon dioxide and water, comprising the following plant components in operative connection with one another:

(a) a means for providing a physical absorption medium;

(b) a scrubbing apparatus and a means for supplying the synthesis gas and for supplying absorption medium to the scrubbing apparatus, wherein the scrubbing apparatus is configured for removing water present in the synthesis gas by scrubbing the synthesis gas with absorption medium, thus making it possible to obtain in the scrubbing apparatus a synthesis gas at least partially freed of water and a mixture of absorption medium and water, and means for withdrawing the synthesis gas at least partially freed of water and the mixture of absorption medium and water from the scrubbing apparatus;

c) a thermal separation apparatus and a means for supplying the mixture of absorption medium and water to the thermal separation apparatus, wherein the mixture of absorption medium and water is separable into water and absorption medium in the separation apparatus, and means for withdrawing the water from the thermal separation apparatus and means for withdrawing the absorption medium from the thermal separation apparatus and for supplying the absorption medium to the scrubbing apparatus according to (b) to remove the water present in the synthesis gas in the scrubbing apparatus;

(d) an absorption apparatus and a means for supplying the synthesis gas at least partially freed of water to the absorption apparatus, wherein the absorption apparatus is configured such that carbon dioxide is removable from the synthesis gas by physical absorption of the carbon dioxide in the absorption medium at absorption pressure and wherein the absorption medium and the synthesis gas may be run in countercurrent in the absorption apparatus, thus making it possible to obtain an absorption medium laden at least with carbon dioxide and a synthesis gas at least partially freed of carbon dioxide and water, and means for withdrawing the absorption medium laden at least with carbon dioxide and the synthesis gas at least partially freed of carbon dioxide and water from the absorption apparatus;

(e) a regeneration apparatus, wherein the regeneration apparatus is configured for removing carbon dioxide from the laden absorption medium withdrawable from the absorption apparatus by desorption of the carbon dioxide by pressure reduction relative to the absorption pressure, thus making it possible to obtain an at least partially regenerated absorption medium, means for withdrawing the desorbed carbon dioxide and the at least partially regenerated absorption medium from the regeneration apparatus and means for recycling the at least partially regenerated absorption medium to the absorption apparatus according to (d) for use as absorption medium.

11. The plant according claim 10, further comprising a means for supplying a subamount of the at least partially regenerated absorption medium withdrawable from the regeneration apparatus to the scrubbing column for removal of water present in the synthesis gas.

12. The plant according to claim 10, wherein upstream of the scrubbing apparatus in the flow direction of the synthesis gas a heat exchanger and a separation apparatus are arranged successively, wherein the heat exchanger is configured for cooling the synthesis gas to below the dew point of water and the separation apparatus is configured for separating the condensed-out water from the synthesis gas and wherein the plant comprises means for supplying the water condensed out in the separation apparatus to the thermal separation apparatus.

13. The plant according to claim 12, further comprising a means for withdrawing synthesis gas from the separation apparatus and means for supplying the synthesis gas withdrawable from the separation apparatus to the scrubbing apparatus for further removal of water present in the synthesis gas.

14. The plant according to claim 10, further comprising a means for cooling gaseous absorption medium withdrawable from the thermal separation apparatus, wherein the means are configured such that the absorption medium is coolable to below the dew point of the absorption medium.

15. The plant according to claim 10, further comprising a means for withdrawing gaseous absorption medium from the thermal separation apparatus and means for supplying the gaseous absorption medium to the regeneration apparatus as stripping medium for removal of carbon dioxide from the laden absorption medium in the regeneration apparatus by stripping.

16. The plant according to claim 10, further comprising no means for hot regeneration of the laden absorption medium.

17. The plant according to claim 10, further comprising a means for withdrawing a subamount of the at least partially regenerated absorption medium withdrawable from the regeneration apparatus and means for supplying the at least partially regenerated absorption medium to the thermal separation apparatus, thus making it possible to remove water residues from the absorption medium by scrubbing with the at least partially regenerated absorption medium in the thermal separation apparatus, wherein the plant comprises means for withdrawing the absorption medium freed of water residues from the thermal separation apparatus.

* * * * *